US012581334B2

(12) United States Patent
Hishi et al.

(10) Patent No.: US 12,581,334 B2
(45) Date of Patent: Mar. 17, 2026

(54) RU APPARATUS, DU APPARATUS, COMMUNICATION SYSTEM, COMMUNICATION METHOD, AND NON-TRANSITORY COMPUTER-READABLE MEDIUM

(71) Applicant: NEC Corporation, Tokyo (JP)

(72) Inventors: Ukyo Hishi, Tokyo (JP); Atsushi Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 18/276,369

(22) PCT Filed: Feb. 24, 2021

(86) PCT No.: PCT/JP2021/006805
§ 371 (c)(1),
(2) Date: Aug. 8, 2023

(87) PCT Pub. No.: WO2022/180670
PCT Pub. Date: Sep. 1, 2022

(65) Prior Publication Data
US 2024/0306017 A1 Sep. 12, 2024

(51) Int. Cl.
*H04W 24/08* (2009.01)
*H04L 43/0823* (2022.01)
*H04W 88/08* (2009.01)

(52) U.S. Cl.
CPC ......... *H04W 24/08* (2013.01); *H04L 43/0847* (2013.01); *H04W 88/08* (2013.01)

(58) Field of Classification Search
CPC .... H04W 24/08; H04W 88/08; H04L 43/0847
(Continued)

(56) References Cited

U.S. PATENT DOCUMENTS

| 2019/0245740 A1 | 8/2019 | Kachhla |
| 2019/0313288 A1 | 10/2019 | Li et al. |
| 2022/0209929 A1* | 6/2022 | Visser ................. H04L 41/0894 |

FOREIGN PATENT DOCUMENTS

| JP | 2005-110096 A | 4/2005 |
| JP | 2013-251795 A | 12/2013 |

(Continued)

OTHER PUBLICATIONS

JP Office Action for JP Application No. 2023-501703 , mailed on Nov. 5, 2024 with English Translation.

(Continued)

*Primary Examiner* — Michael R Neff
(74) *Attorney, Agent, or Firm* — Sughrue Mion, PLLC

(57) ABSTRACT

An object of the present disclosure is to provide a remote unit (RU) apparatus that can effectively utilize statistical information of packets generated in a RU apparatus and a distributed unit (DU) apparatus that execute separated functions in a base station. A RU apparatus (10) according to the present disclosure includes: a reception unit (11) that receives a packet from a DU apparatus (20) that executes processing of a higher-level layer than a layer to be executed by the RU apparatus (10) among communication functions of a base station that are divided into a plurality of layers; and a transmission unit (12) that transmits an alarm signal to the DU apparatus (20) or a management apparatus that manages a network when statistical information regarding the received packet satisfies a predetermined criterion.

14 Claims, 10 Drawing Sheets

(58) Field of Classification Search
USPC ........................................................ 455/423
See application file for complete search history.

(56) References Cited

FOREIGN PATENT DOCUMENTS

| | | | |
|---|---|---|---|
| JP | 2016-152548 A | 8/2016 |
| JP | 2019-176289 A | 10/2019 |

OTHER PUBLICATIONS

International Search Report for PCT Application No. PCT/JP2021/006805, mailed on May 18, 2021.
O-RAN.WG4.MP.0-v03.00, 2020.
Anil Umesh et al., "Trends in standardization for open and intelligent wireless access networks—Overview of O-RAN front hall specifications," NTT Docomo Technical Journal, vol. 27, No. 1, Apr. 30, 2019, pp. 43-55.
Japanese Office Communication for JP Application No. 2023-501703 mailed on Mar. 11, 2025 with English Translation.
Extended European Search Report for EP Application No. 21927774.6, dated on Mar. 18, 2024.
O-RAN Fronthaul Working Group 4: "Control, User and Synchronization Plane Specification", Aug. 2, 2019, pp. 1-218.
O-RAN Fronthaul Working Group 4: "Management Plane Specification", Jul. 3, 2019, pp. 1-149.

* cited by examiner 10, 20, 30, 40, 50, 80

NETWORK INTERFACE ⌐1201

PROCESSOR ⌐1202

MEMORY ⌐1203

RU APPARATUS, DU APPARATUS, COMMUNICATION SYSTEM, COMMUNICATION METHOD, AND NON-TRANSITORY COMPUTER-READABLE MEDIUM

This application is a National Stage Entry of PCT/JP2021/006805 filed on Feb. 24, 2021, the contents of all of which are incorporated herein by reference, in their entirety.

TECHNICAL FIELD

The present disclosure relates to an RU apparatus, a DU apparatus, a communication system, a communication method, and a program.

BACKGROUND ART

In recent years, a radio access network in which a baseband unit and a radio unit of a base station are separated and the baseband unit and the radio unit are connected via a fronthaul has been used. Open-Radio Access Network (O-RAN) fronthaul specifications defined in an O-RAN alliance define fronthaul specifications between an O-RAN Radio Unit (O-RU) being equivalent to the radio unit and an O-RAN Distributed Unit (O-DU) being equivalent to the baseband unit. The O-RAN fronthaul specifications have one object to facilitate connection between an O-DU of a certain vendor and an O-RU of a different vendor and to achieve multivendor environment of a radio access network.

Non Patent Literature 1 defines specifications regarding a Management (M)-Plane defined for transmitting administrative data between an O-RU and an O-DU. Non Patent Literature 1 discloses that the O-RU generates statistical information by totalizing packets received from the O-DU.

CITATION LIST

Non Patent Literature

[Non Patent Literature 1] O-RAN.WG4.MP.0-v03.00

SUMMARY OF INVENTION

Technical Problem

However, Non Patent Literature 1 does not disclose a specific utilization method of the statistical information generated by the O-DU or the O-RU. This is also true in a Centralized Radio Access Network (C-RAN) adopted in Long Term Evolution (LTE) defined in 3rd Generation Partnership Project (3GPP).

An object of the present disclosure is to provide an RU apparatus, a DU apparatus, a communication system, a communication method, and a program, that include a means for utilizing statistical information of packets generated in the RU apparatus and the DU apparatus that execute separated functions of a base station.

Solution to Problem

A remote unit (RU) apparatus according to a first aspect of the present disclosure includes: a reception unit configured to receive a packet from a distributed unit (DU) apparatus configured to execute processing of a higher-level layer than a layer to be executed by a remote unit (RU) apparatus among communication functions of a base station that are divided into a plurality of layers; and a transmission unit configured to transmit an alarm signal to the DU apparatus or a management apparatus configured to manage a network when statistical information regarding the received packet satisfies a predetermined criterion.

A DU apparatus according to a second aspect of the present disclosure includes: a reception unit configured to receive a packet from an RU apparatus configured to execute processing of a lower-level layer than a layer to be executed by the DU apparatus among communication functions of a base station that are divided into a plurality of layers; and a transmission unit configured to transmit an alarm signal to a management apparatus configured to manage a network when statistical information regarding the received packet satisfies a predetermined criterion.

A communication system according to a third aspect of the present disclosure includes: an RU apparatus configured to execute a part of layer processing among communication functions of a base station that are divided into a plurality of layers; a DU apparatus configured to transmit and receive a packet to and from the RU apparatus, and execute processing of a higher-level layer than a layer to be executed by the RU apparatus; and a management apparatus configured to manage a network including the RU apparatus and the DU apparatus, wherein at least one of the RU apparatus and the DU apparatus transmits an alarm signal to the management apparatus when statistical information regarding the received packet satisfies a predetermined criterion, and the management apparatus transmits the predetermined criterion to at least one of the RU apparatus that transmits the alarm signal and the DU apparatus that transmits the alarm signal.

A communication method according to a fourth aspect of the present disclosure includes: receiving a packet from a distributed unit (DU) apparatus configured to execute processing of a higher-level layer than a layer to be executed by a remote unit (RU) apparatus among communication functions of a base station that are divided into a plurality of layers; and transmitting, when statistical information regarding the received packet satisfies a predetermined criterion, an alarm signal to the DU apparatus or a management apparatus configured to manage a network.

A program according to a fifth aspect of the present disclosure causes a computer to execute: receiving a packet from a distributed unit (DU) apparatus configured to execute processing of a higher-level layer than a layer to be executed by a remote unit (RU) apparatus among communication functions of a base station that are divided into a plurality of layers; and transmitting an alarm signal to the DU apparatus or a management apparatus configured to manage a network when statistical information regarding the received packet satisfies a predetermined criterion.

Advantageous Effects of Invention

According to the present disclosure, it is possible to provide an RU apparatus, a DU apparatus, a communication system, a communication method, and a program that are able to effectively utilize statistical information of packets generated in an RU apparatus and a DU apparatus that execute functions of separated base stations.

EXAMPLE EMBODIMENT

First Example Embodiment

Figure 1:
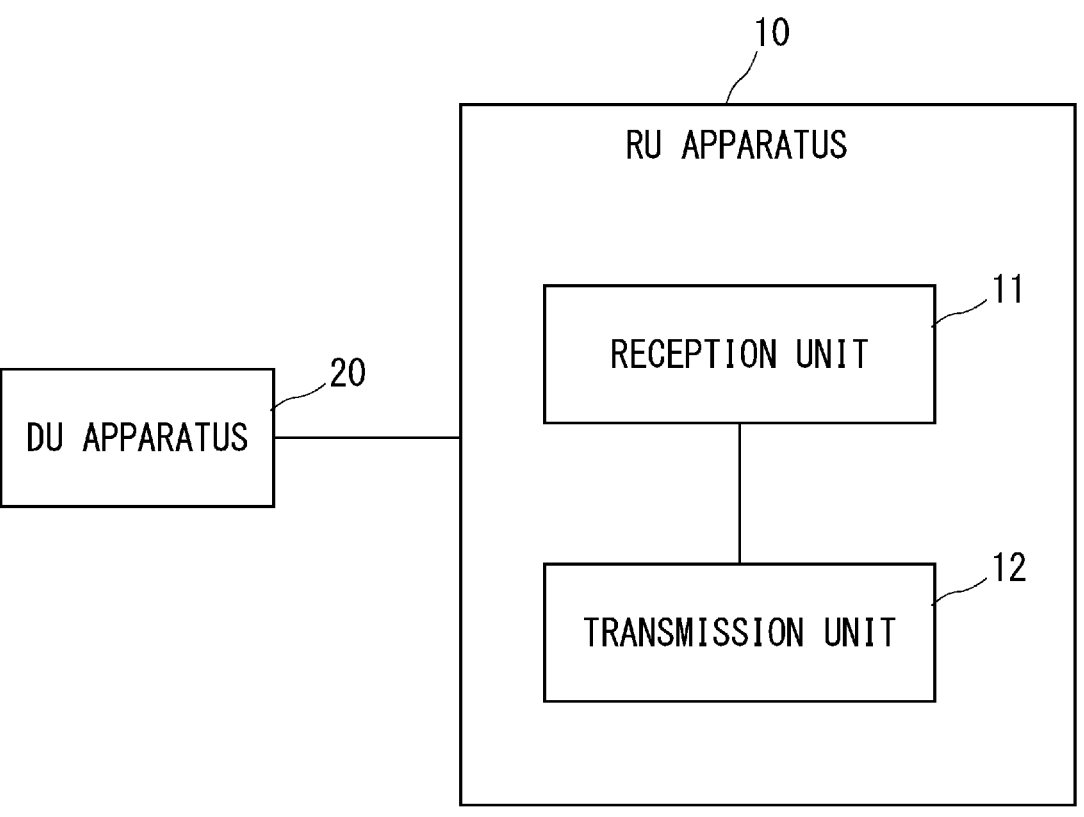
FIG. 1 is a configuration diagram of an RU apparatus according to a first example embodiment.

Hereinafter, example embodiments of the present disclosure will be explained with reference to the drawings. A configuration example of an RU apparatus 10 according to a first example embodiment will be explained with reference to FIG. 1. The RU apparatus may be a computer apparatus that operates by a processor executing a program stored in a memory.

The RU apparatus 10 may execute processing of a lower-level layer among communication functions of a base station divided into a plurality of layers. Meanwhile, a DU apparatus 20 may execute processing of a higher-level layer than the layer to be executed by the RU apparatus 10. The RU apparatus 10 performs wireless communication with a communication terminal existing in a communication area formed by the RU apparatus 10. The communication terminal may be, for example, a smart phone terminal, an Internet of Things (IoT) terminal, or the like. Alternatively, the communication terminal may be an apparatus defined as User Equipment (UE) in 3GPP. The base station may be, for example, an evolved Node B (eNB) that is defaulted as a base station that supports Long Term Evolution (LTE) in 3GPP, or may be a base station that supports so-called 5G.

The RU apparatus 10 includes a reception unit 11 and a transmission unit 12. The reception unit 11 and the transmission unit 12 may be software or modules that execute processing by the processor executing a program stored in a memory. Alternatively, the reception unit 11 and the transmission unit 12 may be hardware such as a circuit or a chip.

The reception unit 11 receives a packet from the DU apparatus 20. The RU apparatus 10 and the DU apparatus 20 may be connected, for example, via a fixed communication network or may be connected via a wireless communication network. The packet to be received by the RU apparatus 10 may be, for example, control data required for the communication terminal to utilize a mobile network provided by a communication carrier. Furthermore, the packet to be received by the RU apparatus 10 may be user data addressed to the communication terminal. Further, the packet to be received by the RU apparatus 10 may be management data used for managing a communication network including the RU apparatus 10 and the DU apparatus 20.

The transmission unit 12 transmits an alarm signal to DU apparatus 20 or a management apparatus that manages a network when statistical information regarding the received packet satisfies a predetermined criterion.

The statistical information regarding the received packet may be, for example, information acquired by classifying the received packet by using the number of received packets. The number of received packets may be, for example, the number of normally received packets, the number of packets including errors received, the number of packets received at a predetermined timing, the number of packets that cannot be received at a predetermined timing, or the like. The predetermined criterion may be, for example, that a ratio of at least one of the number of normally received packets, the number of packets including an error being received, the number of packets received at a predetermined timing, and the number of packets that cannot be received at a predetermined timing to a total number of received packets exceeds or falls below a predetermined threshold value.

The predetermined criterion may be, for example, a type of the received packet.

The RU apparatus 10 may receive at least one of information indicating a predetermined criterion and information indicating a predetermined threshold value from the DU apparatus 20 or the management apparatus that manages a network.

The management apparatus that manages a network may be, for example, an apparatus that manages a network including the DU apparatus 20 and the RU apparatus 10. Alternatively, the management apparatus may be an apparatus that manages a network including an access network including the DU apparatus 20 and the RU apparatus 10, and a core network that manages the access network.

The alarm signal may be a signal used for notifying an abnormal state, a failure, a fault, or the like occurring in the RU apparatus 10. Alternatively, the alarm signal may be a signal used for notifying an abnormal state, a failure, a fault, or the like occurring on a transmission path between the RU apparatus 10 and the DU apparatus 20.

Alternatively, the alarm signal may be a signal used for notifying that a logical connection of at least one of a C-Plane and a U-Plane between the RU apparatus 10 and the DU apparatus 20 is unstable.

The transmission unit 12 may transmit an alarm signal to the management apparatus via the DU apparatus 20, or may transmit an alarm signal to the management apparatus not via the DU apparatus 20. Further, the transmission unit 12 may transmit an alarm signal to the DU apparatus 20 via the management apparatus, or may transmit an alarm signal to the DU apparatus 20 not via the management apparatus.

In addition, the transmission unit 12 may stop the transmission of the alarm signal to the DU apparatus 20 or the management apparatus that manages the network when the statistical information regarding the received packet does not satisfy a predetermined criterion.

Figure 2:
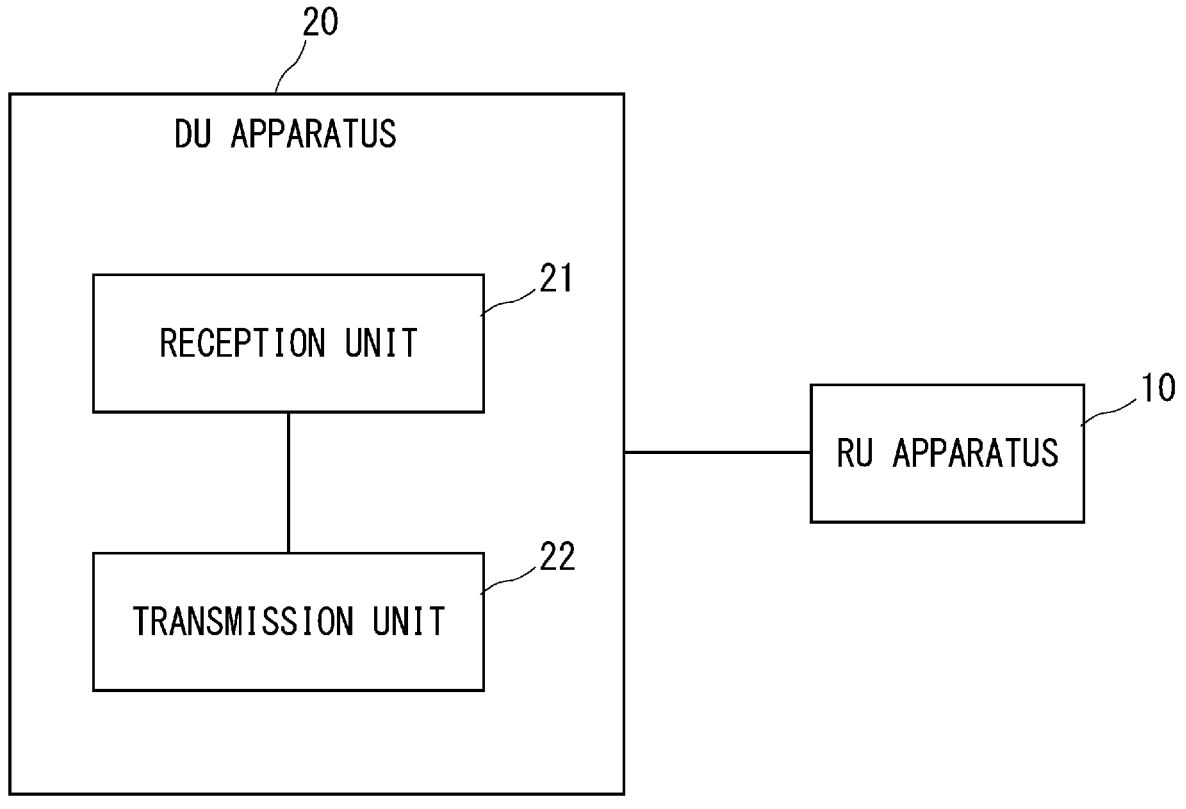
FIG. 2 is a configuration diagram of a DU apparatus according to the first example embodiment.

Next, a configuration example of the DU apparatus 20 according to the first example embodiment will be explained with reference to FIG. 2. The DU apparatus 20 may be a computer apparatus that operates by a processor executing a program stored in a memory.

The DU apparatus 20 includes a reception unit 21 and a transmission unit 22. The reception unit 21 and the transmission unit 22 may be software or modules that execute processing by the processor executing a program stored in a memory. Alternatively, the reception unit 21 and the transmission unit 22 may be hardware such as a circuit or a chip.

The reception unit 21 receives a packet from the RU apparatus 10. The packet received by the DU apparatus 20 may be, for example, control data required for the communication terminal to use a mobile network provided by a communication carrier. Furthermore, the packet received by the DU apparatus 20 may be user data transmitted from the communication terminal via the RU apparatus 10. Further, the packet received by the DU apparatus 20 may be management data used for managing a communication network including the RU apparatus 10 and the DU apparatus 20.

The transmission unit 22 transmits an alarm signal to the management apparatus that manages the network when the statistical information regarding the received packet satisfies a predetermined criterion. The statistical information regarding the received packet is the same as the statistical information in the RU apparatus 10.

The predetermined criterion may also be the same as the predetermined criterion in the RU apparatus 10.

The DU apparatus 20 may receive at least one of information indicating a predetermined criterion and information indicating a predetermined threshold value from a management apparatus that manages a network.

As described above, the RU apparatus 10 can transmit the alarm signal generated based on the received packet to another apparatus other than the RU apparatus 10. As a result, an administrator who manages the DU apparatus 20 or an administrator who manages the management apparatus can detect a fault or the like occurring in the RU apparatus 10 or a transmission path between the RU apparatus 10 and the DU apparatus 20 by receiving the alarm signal. In other words, the administrator who manages the DU apparatus 20 does not need to actively acquire the statistical information being managed by the RU apparatus 10, and does not need to analyze the statistical information in order to detect a fault or the like occurring in the RU apparatus 10 or the like. Therefore, by using the RU apparatus 10, a management load of an administrator who manages a network including the RU apparatus 10 and the DU apparatus 20 can be reduced.

Furthermore, the DU apparatus 20 can also transmit an alarm signal to other apparatuses other than the DU apparatus 20, similarly to the RU apparatus 10. As a result, the administrator who manages the management apparatus can detect a fault or the like occurring in the DU apparatus 20 or the transmission path between the RU apparatus 10 and the DU apparatus 20 by receiving the alarm signal. The administrator who manages the management apparatus does not need to actively acquire the statistical information managed by the DU apparatus 20, and does not need to analyze the statistical information in order to detect a fault or the like occurring in the DU apparatus 20 or the like. Therefore, by using the DU apparatus 20, the management load of the administrator who manages the network including the RU apparatus 10 and the DU apparatus 20 can be reduced.

Second Example Embodiment

Figure 3:
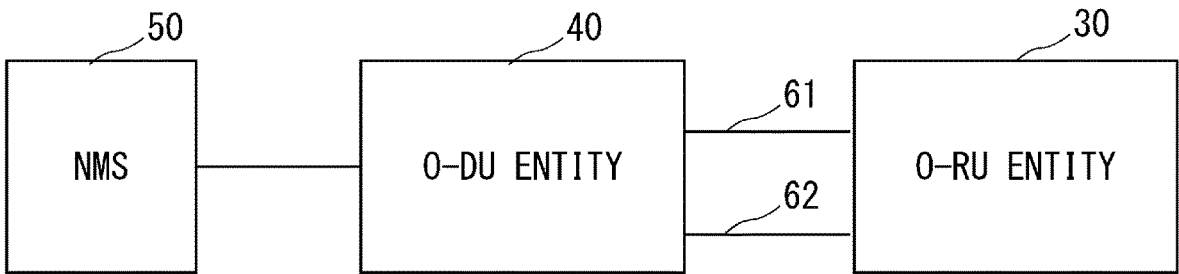
FIG. 3 is a configuration diagram of a communication system according to a second example embodiment.

Next, a configuration example of a communication system according to a second example embodiment will be explained with reference to FIG. 3. The communication system in FIG. 3 includes an O-RU entity 30 and an O-DU entity 40 defined in an O-RAN alliance. Further, a Network Management System (NMS) 50 is a system that manages the O-RU entity 30 and the O-DU entity 40.

The NMS 50 is equivalent to the management apparatus. The NMS 50 may be replaced with a Service Management and Orchestration System (SMO). The O-RU entity 30 is equivalent to the RU apparatus 10. The O-DU entity 40 is equivalent to the DU apparatus 20. In the following explanation, it is assumed that the O-RU entity 30 includes the reception unit 11 and the transmission unit 12 of the RU apparatus 10, and the O-DU entity 40 includes the reception unit 21 and the transmission unit 22 of the DU apparatus 20.

The O-RU entity 30 executes, for example, Radio Frequency (RF) processing and processing related to a Low-PHY layer. The Low-PHY layer may be, for example, a layer on which processing related to Fast Fourier Transform (FFT), inverse FFT (iFFT), digital beamforming, and Physical Random Access Channel (PRACH) extraction is executed. The PRACH extraction is, for example, processing in which, when the UE establishes a connection with the O-RU entity 30, the O-RU entity 30 extracts or detects the PRACH, which is a signal transmitted first from the UE. The O-RU entity 30 may be a Transmission Reception Point (TRP) or a Radio Remote Head (RRH) defined in 3GPP.

The O-DU entity 40 executes, for example, processing related to a Radio Link Control (RLC) layer, a Medium Access Control (MAC) layer, and a High-PHY layer. The High-PHY layer is, for example, a layer on which processing related to Forward Error Correction (FEC) encoding, FEC decoding, scrambling, modulating, and demodulating is executed. The processing executed in the O-RU entity 30 and the O-DU entity 40 is not limited to the above-described contents, and may be changed from the above-described contents.

The O-RU entity 30 communicates with the O-DU entity 40 via a transmission path 61 and a transmission path 62. The transmission path 61 transmits C-Plane data and U-Plane data. The transmission path 62 transmits M-Plane data. The C-Plane data, the U-Plane data, and the M-Plane data may be transmitted as packets. The transmission path 61 and the transmission path 62 may be referred to as Fronthaul (FH) or a fronthaul interface. The transmission path 61 and the transmission path 62 may require a predetermined frequency band.

The NMS 50 is connected to the O-DU entity 40 via a network. For example, the NMS 50 may set management data in the O-DU entity 40 and further set management data in the O-RU entity 30 via the O-DU entity 40. The management data may be transmitted as M-Plane data to the O-RU entity 30 via the transmission path 62. The management data may be set by using YANG DATA MODEL defined in the O-RAN Alliance. In addition, the management data may be set in the O-RU entity 30 by using, for example, an o-ran-supervision.yang Module or an o-ran-performance-management.yang Module.

The management data may be preset in at least one of the O-DU entity 40 and the O-RU entity 30.

The C-Plane is a protocol for transferring a control signal. The U-Plane is a protocol for transferring user data. In the C-Plane and U-Plane, a protocol stack that transmits a signal used in an enhanced Common Public Radio Interface (eC-PRI) or Radio over Ethernet (RoE) by using Ethernet/IP/ User Datagram Protocol (UDP) is supported. Alternatively, the C-Plane and the U-Plane may support a protocol stack that transmits a signal used in eCPRI or RoE by directly using Ethernet. The M-Plane is a protocol for transferring a monitoring signal used for monitoring or maintaining an apparatus.

Next, statistical information generated by the O-RU entity 30 or the O-DU entity 40 will be explained. The O-RU entity 30 or the O-DU entity 40 measures a packet received as C-Plane data or U-Plane data by using various counters.

The various counters may be, for example, RX_ON_ TIME, RX_ON_TIME_C, RX_EARLY, RX_EARLY_C, RX_LATE, RX_LATE_C, and RX_TOTAL. The RX_ON_ TIME, RX_ON_TIME_C, RX_EARLY, RX_EARLY_C, RX_LATE, RX_LATE_C, and RX_TOTAL are definitions of counters defined as measurement-object in Rx Window Statistics in the O-RAN alliance.

Figure 4:
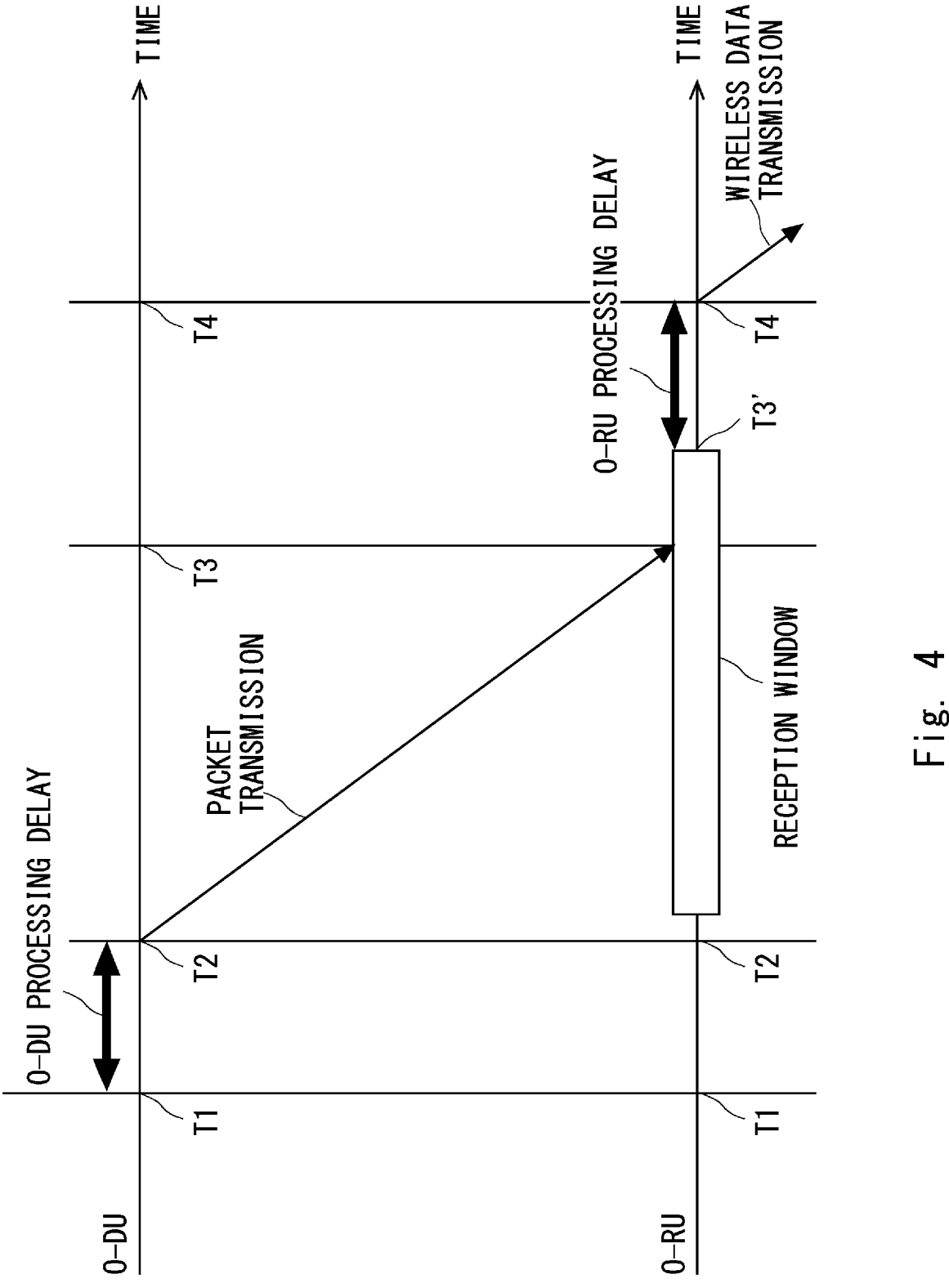
FIG. 4 is a diagram for explaining a method of delay management according to the second example embodiment.

Herein, before explaining the RX_ON_TIME, RX_ON_TIME_C, RX_EARLY, RX_EARLY_C, RX_LATE, RX_LATE_C, and RX_TOTAL in detail, a method of delay management executed in the O-RU entity 30 will be explained with reference to FIG. 4. FIG. 4 illustrates transmitting a packet from the O-DU entity 40 to the O-RU entity 30. A method of delay management executed in the O-DU entity 40 is the same as that of the O-RU entity 30, and thus a detailed explanation thereof will be omitted.

FIG. 4 illustrates that the O-RU entity 30 and the O-DU entity 40 perform delay management by using the same time axis. In short, the O-RU entity 30 and the O-DU entity 40 perform time synchronization. T1 to T4 indicate times.

The time T4 is a timing at which the O-RU entity 30 transmits wireless data to the UE. Delay management is performed in the O-RU entity 30 and the O-DU entity 40 in order for the O-RU entity 30 to transmit wireless data at a predetermined time T4. The O-RU entity 30 needs to complete various kinds of processing such as iFFT, analog conversion, and beamforming in such a way as to be in time for transmission of wireless data at the time T4. A time from a time T3' to the time T4 is a time for the O-RU entity 30 to execute various kinds of processing such as iFFT, analog conversion, and beamforming. In FIG. 4, the time from the time T3' to the time T4 is taken as an O-RU processing delay.

In the O-RU entity 30, a reception window is set before the time T4, which is a timing at which wireless data are transmitted, for a time of the O-RU processing delay. A period during which the O-RU entity 30 can normally receive a packet is defined as a reception window. In short, when receiving a packet in the reception window, the O-RU entity 30 can transmit the received packet as wireless data at time T4, which is a timing at which wireless data are transmitted. The reception window indicates a period before the time T3'. The reception window may be a period from the time T2, which is a timing at which the O-DU entity 40 transmits a packet, to the time T3', or may be a period from an arbitrary timing from the time T2 to the time T3', to the time T3'.

A period from the time T2 to the time T3 is a transmission delay between the O-DU entity 40 and the O-RU entity 30, and may be referred to as a fronthaul delay. The fronthaul is a line between the O-DU entity 40 and the O-RU entity 30. For example, an optical fiber or the like may be used as the fronthaul. Standards for the fronthaul are defined in the O-RAN Alliance.

The period from the time T1 to the time T2 indicates an O-DU processing delay. The O-DU processing delay is a period in which processing for the O-DU entity 40 to transmit a packet is executed. A predetermined period from the time T2 may be defined as a transmission window in the O-DU entity 40. The transmission window is a period in which a packet transmitted from the O-DU entity 40 can reach the O-RU entity 30 by the reception window in the O-RU entity 30.

In FIG. 4, an example in which a reception window is set in the O-RU entity 30 has been explained, but a reception window is also set in the O-DU entity 40. The O-DU entity 40 can normally transmit data to other apparatuses by receiving a packet transmitted from the O-RU entity 30 in the reception window.

Next, details of RX_ON_TIME, RX_ON_TIME_C, RX_EARLY, RX_EARLY_C, RX_LATE, RX_LATE_C, and RX_TOTAL will be explained. RX_ON_TIME, RX_ON_TIME_C, RX_EARLY, RX_EARLY_C, RX_LATE, RX_LATE_C, and RX_TOTAL may be indices by which the O-RU entity 30 or the O-DU entity 40 counts the number of packets. The O-RU entity 30 or the O-DU entity 40 may count RX_ON_TIME, RX_ON_TIME_C, RX_EARLY, RX_EARLY_C, RX_LATE, RX_LATE_C, and RX_TOTAL for packets arriving during a predetermined monitoring period. The monitoring period may be a period measured by C/U-plane monitoring period or C/U-plane Monitoring Timer. Furthermore, the monitoring period may be a configured-cu-monitoring-interval.

RX_ON_TIME counts the number of packets of U-Plane data that have arrived at the O-RU entity 30 or the O-DU entity 40 within the reception window. The number of packets of the U-Plane data that have arrived in the reception window includes a packet having a sequence number error or a packet having an error such as a corrupted (corruption) packet.

RX_ON_TIME_C counts the number of packets of C-Plane data that have arrived at the O-RU entity 30 or the O-DU entity 40 within the reception window. The number of packets of the C-Plane data that have arrived in the reception window includes a packet having a sequence number error or a packet having an error such as a corrupted (corruption) packet.

RX_EARLY counts the number of packets of U-Plane data that have arrived at the O-RU entity 30 or the O-DU entity 40 before the reception window starts. RX_EARLY_C counts the number of packets of C-Plane data that have arrived at the O-RU entity 30 or the O-DU entity 40 before the reception window starts.

RX_LATE counts the number of packets of U-Plane data that have arrived at the O-RU entity 30 or the O-DU entity 40 after the reception window ends. RX_LATE_C counts the number of packets of C-Plane data that have arrived at the O-RU entity 30 or the O-DU entity 40 after the reception window ends.

RX_TOTAL counts the number of all packets received during a given monitoring period, including the reception window. All packets include C-Plane data and U-Plane data. Further, all the packets include all packets counted in RX_ON_TIME, RX_ON_TIME_C, RX_EARLY, RX_EARLY_C, RX_LATE, and RX_LATE_C. Also, all the packets may include packets counted in other counters that differ from RX_ON_TIME, RX_ON_TIME_C, RX_EARLY, RX_EARLY_C, RX_LATE, and RX_LATE_C.

Next, setting processing of management data in the O-DU entity 40 according to the second example embodiment will be explained with reference to FIG. 5. First, the reception unit 21 of the O-DU entity 40 receives management data from the NMS 50 (S10). The management data include, for example, at least one of a packet type to be measured, an abnormality detection method, and a threshold value for notifying an alarm. The packet type to be measured is information indicating, for example, whether to measure a packet that is C-Plane data, whether to measure a packet that is U-Plane data, or whether to measure packets of both C-Plane data and U-Plane data. When the packets of both the C-Plane data and the U-Plane data are measured, the C-Plane data and the U-Plane data may be measured distinctively, or the C-Plane data and the U-Plane data may be measured without distinction. The management data may be trigger information for the O-RU entity 30 or the O-DU entity 40 to send an alarm.

The abnormality detection method may be, for example, to transmit an alarm when a ratio of the number of RX_EARLY or RX_LATE to the total number of RX_ON_
TIME, RX_EARLY, and RX_LATE exceeds a threshold
value. Namely, the abnormality detection method may be,
for example, to transmit an alarm when a ratio of packets
received outside a period of the reception window exceeds
a threshold value. Alternatively, when the ratio of the
number of RX_EARLY or RX_LATE to the number of
RX_TOTAL exceeds a threshold value, it may be to transmit
an alarm. Alternatively, when the ratio of the number of
RX_EARLY or RX_LATE to the number of RX_ON_TIME
exceeds a threshold value, it may be to transmit an alarm.
The same applies to the number of packets counted by using
the counter related to the C-Plane data.

Alternatively, the abnormality detection method may be
to transmit an alarm when a ratio of the number of RX_ON_
TIME to the total number of RX_ON_TIME, RX_EARLY,
and RX_LATE is lower than a threshold value. Alterna-
tively, the abnormality detection method may be to transmit
an alarm when a ratio of the number of RX_ON_TIME to
the number of RX_TOTAL is lower than a threshold value.
Alternatively, the abnormality detection method may be to
transmit an alarm when a ratio of the number of RX_ON_
TIME to the number of RX_EARLY or RX_LATE is lower
than a threshold value. The same applies to the number of
packets counted by using the counter related to the C-Plane
data.

Alternatively, the abnormality detection method may be
to transmit an alarm when RX_ON_TIME exceeds a thresh-
old value. Alternatively, the abnormality detection method
may be to transmit an alarm when at least one of
RX_EARLY and RX_LATE exceeds a threshold value.
Alternatively, the abnormality detection method may be to
transmit an alarm when at least one of RX_ON_TIME and
RX_ON_TIME_C is lower than a threshold value or 0. The
same applies to the number of packets counted by using the
counter related to the C-Plane data.

Alternatively, the abnormality detection method may be
to transmit an alarm when a packet relevant to RX_EARLY
or RX_LATE is measured continuously for a number of
times determined as a threshold value. The same applies to
the number of packets counted by using the counter related
to the C-Plane data.

A threshold value for transmitting an alarm may be a
numerical value indicating a ratio, the number of packets,
the number of times, or the like. Transmitting an alarm may
be restated as transmitting an alarm signal or an alarm
message.

Next, a control unit of the O-DU entity 40 determines
whether a packet type to be measured is included in man-
agement data (S11). The control unit may be, for example,
a processor or the like included in the O-DU entity 40. The
processing illustrated in FIG. 5 may be executed by a
processor included in the O-DU entity 40, which executes a
program stored in a memory.

When determining that the packet type to be measured is
included in the management data, the control unit of the
O-DU entity 40 sets the packet type specified in the man-
agement data as a packet to be measured (S12). When
determining that the packet type to be measured is not
included in the management data, the control unit of the
O-DU entity 40 sets the packet type determined as a default
value, as the packet to be measured (S13). The default value
may be stored in advance in a memory or the like in the
O-DU entity 40.

After step S12 or S13, the control unit of the O-DU entity
40 determines whether an abnormality detection method is
included in the management data (S14). When it is determined that the abnormality detection method is included in
the management data, the control unit of the O-DU entity 40
sets the abnormality detection method specified in the man-
agement data (S15). When it is determined that the abnor-
mality detection method is not included in the management
data, the control unit of the O-DU entity 40 sets the
abnormality detection method determined as a default value
(S16). The default value may be stored in advance in a
memory or the like in the O-DU entity 40.

After step S15 or S16, the control unit of the O-DU entity
40 determines whether the management data include a
threshold value for transmitting an alarm (S17). When the
control unit of the O-DU entity 40 determines that the
management data include the threshold value for transmit-
ting an alarm, the control unit sets the threshold value
specified in the management data (S18). When the control
unit of the O-DU entity 40 determines that the threshold
value for transmitting an alarm is not included in the
management data, the control unit sets a threshold value
determined as a default value (S19). The default value may
be stored in advance in a memory or the like in the O-DU
entity 40.

Figure 5:
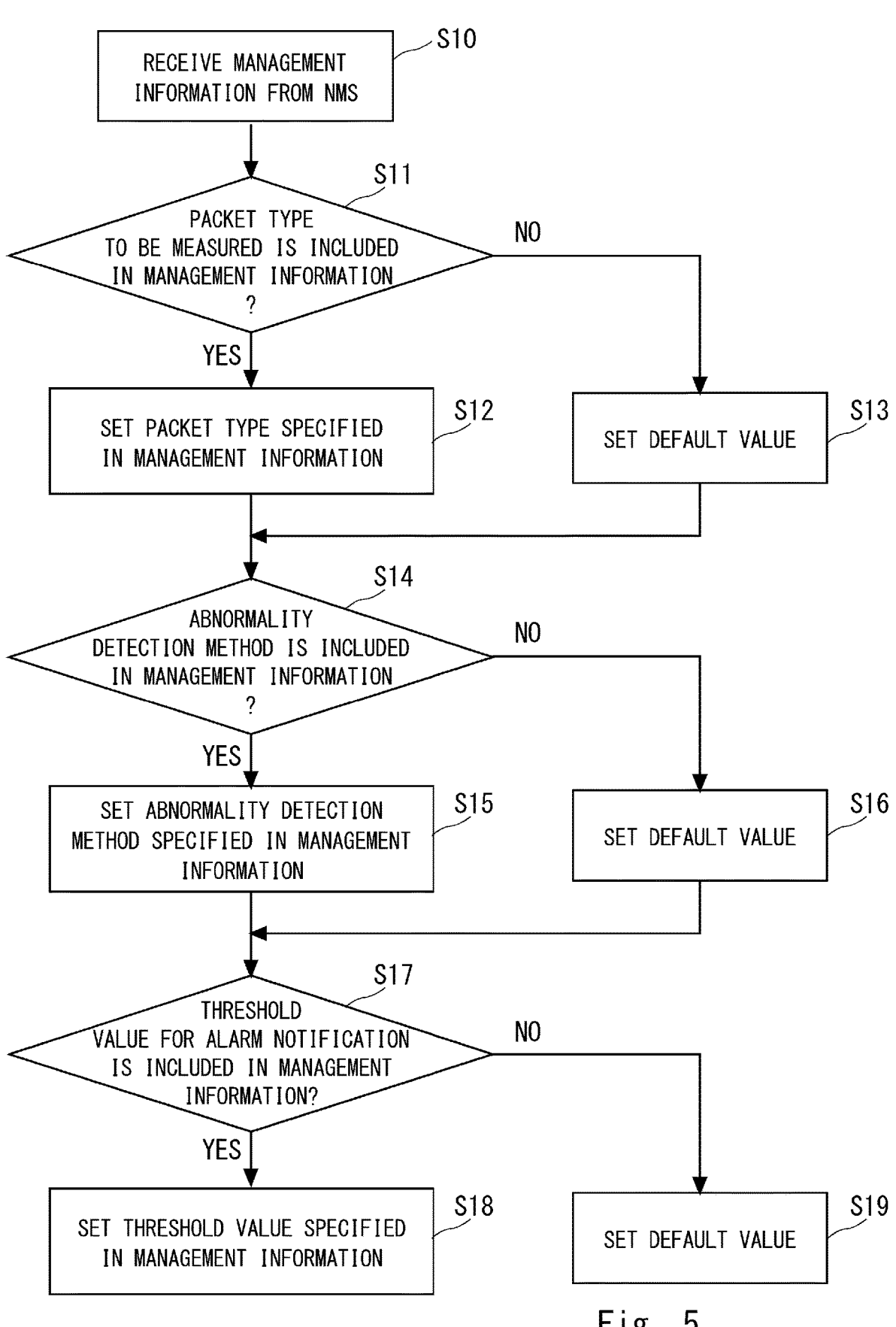
FIG. 5 is a diagram illustrating a flow of processing of setting management data according to the second example embodiment.

In FIG. 5, a flow of processing in the case where the
O-DU entity 40 receives the management data from the
NMS 50 has been explained, but the same processing as in
FIG. 5 is also performed in a case where the O-RU entity 30
receives the management data from the NMS 50 via the
O-DU entity 40. Therefore, detailed explanation of process-
ing of setting management data in the O-RU entity 30 will
be omitted.

Subsequently, a flow of alarm transmission processing in
the O-RU entity 30 according to the second example
embodiment is transmitted with reference to FIG. 6. First,
the reception unit 11 of the O-RU entity 30 receives a packet
of C-Plane data and a packet of U-Plane data from the O-DU
entity 40 (S20). Next, a control unit of the O-RU entity 30
generates statistical information regarding the received
packet (S21). Specifically, the control unit of the O-RU
entity 30 performs measurement of packets using RX_ON_
TIME, RX_ON_TIME_C, RX_EARLY, RX_EARLY_C,
RX_LATE, RX_LATE_C, and RX_TOTAL. The number of
measured packets may be used as the statistical information.
For example, the control unit of the O-RU entity 30 may
count the packets by using all the counters, or may measure
the packets by using only counters that count packets of the
set packet type.

Next, the control unit of the O-RU entity 30 determines
whether statistical information exceeds a threshold value in
a preset abnormality detection method (S22). When the
control unit of the O-RU entity 30 determines that the
statistical information exceeds the threshold value, the trans-
mission unit 12 of the O-RU entity 30 transmits an alarm
(S23). For example, the transmission unit 12 transmits an
alarm to the O-DU entity 40. Alternatively, the transmission
unit 12 may set a destination of the alarm as the NMS 50 and
transmit the alarm to the NMS 50 via the O-DU entity 40.

When the control unit of the O-RU entity 30 determines
that the statistical information does not exceed the threshold
value, the processing of step S20 and subsequent steps is
repeated.

Figure 6:
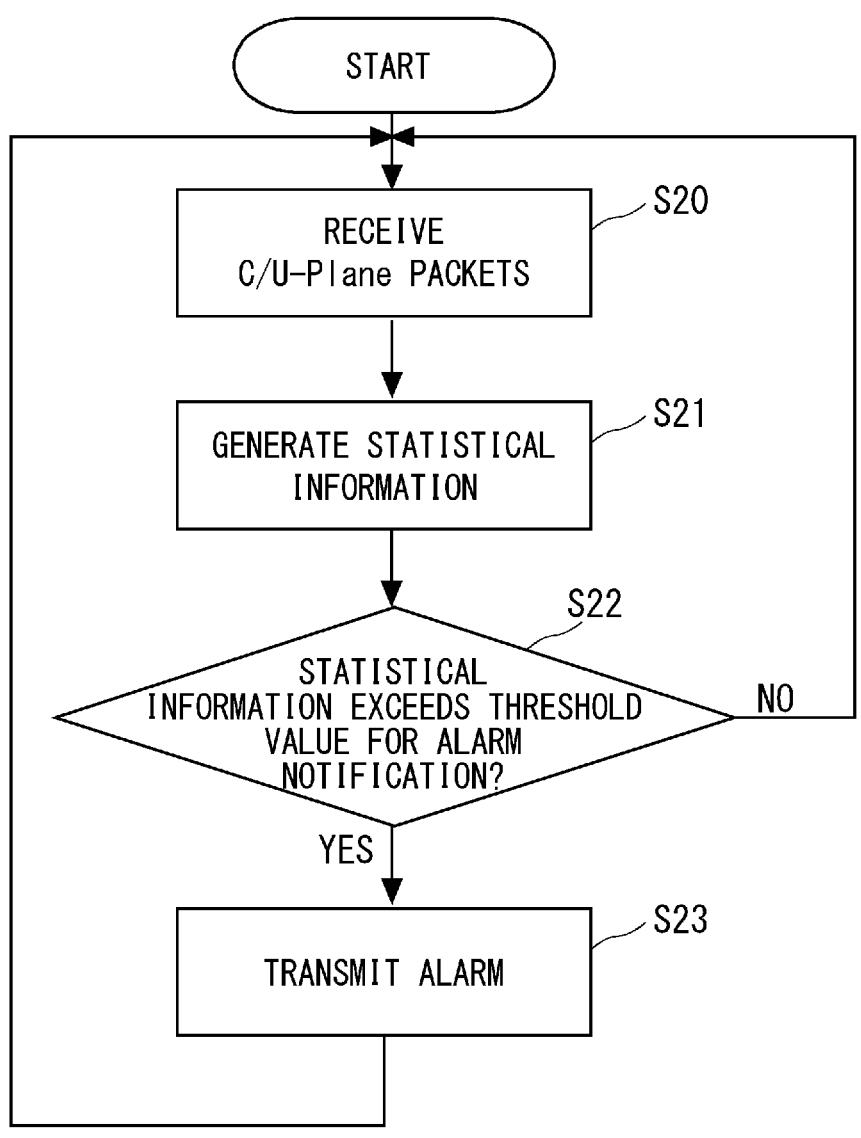
FIG. 6 is a diagram illustrating a flow of alarm transmission processing according to the second example embodiment.

In FIG. 6, a flow of the alarm transmission processing in
the O-RU entity 30 has been explained, but the O-DU entity
40 also executes the same alarm transmission processing as
in FIG. 6. For example, in step S20 of FIG. 6, the O-DU
entity 40 receives a packet of C-Plane data and a packet of
U-Plane data from the O-RU entity 30. In step S23, the
O-DU entity 40 transmits an alarm to the NMS 50. Other processing of the alarm transmission processing of the O-DU entity 40 is the same as that of the O-RU entity 30, and thus a detailed explanation thereof will be omitted.

As described above, the O-RU entity 30 and the O-DU entity 40 use RX_ON_TIME, RX_ON_TIME_C, RX_EARLY, RX_EARLY_C, RX_LATE, RX_LATE_C, and RX_TOTAL and generate statistical data regarding the received packets. Further, the O-RU entity 30 and the O-DU entity 40 transmit an alarm when the statistical information exceeds a threshold value in a preset abnormality detection method. The O-RU entity 30 and the O-DU entity 40 transmit an alarm to an apparatus other than the own apparatus. Therefore, an administrator or the like of the NMS 50 can receive the statistical information from the O-RU entity 30 or the O-DU entity 40 without actively acquiring the statistical information generated in the O-RU entity 30 or the O-DU entity 40. As a result, management loads of the O-RU entity 30 and the O-DU entity 40 in the administrator or the like of the NMS 50 can be reduced.

Third Example Embodiment

Next, statistical information used in a third example embodiment will be explained. In the third example embodiment, RX_CORRUPT, RX_DUPL, RX_SEQID_ERR, RX_SEQID_ERR_C, or RX_ERR_DROP is used, thereby measuring the number of packets. RX_CORRUPT, RX_DUPL, RX_SEQID_ERR, RX_SEQID_ERR_C, or RX_ERR_DROP is a definition of counters defined in the O-RAN Alliance.

RX_CORRUPT counts the number of packets that have been corrupted out of packets that have arrived at the O-RU entity 30 or the O-DU entity 40 within the reception window. The corrupted packet may be, for example, a packet in which an incorrect value is set in a header of the packet, or may be a packet including a protocol error. Among packets in which an incorrect value is set in the header of the packet, a packet in which an incorrect sequence ID is set may be counted by using RX_SEQID_ERR, which will be explained later. The number of corrupted packets may be acquired by measuring a packet of C-Plane data, measuring a packet of the U-Plane data, and measuring without distinguishing between the C-Plane data and U-Plane data.

RX_DUPL counts the number of duplicated packets among the packets that have arrived at the O-RU entity 30 or the O-DU entity 40 within the reception window.

RX_SEQID_ERR counts the number of packets having an error related to a sequence ID among the packets of the U-Plane data that have arrived at the O-RU entity 30 or the O-DU entity 40 within the reception window. An error related to the sequence ID is that an erroneous sequence ID is set in the packet, for example, when a value set in a sequence ID field of the packet header is not a consecutive value from the sequence ID of the packet received last time.

RX_SEQID_ERR_C counts the number of packets having an error related to the sequence ID, among the packets of the C-Plane data that have arrived at the O-RU entity 30 or the O-DU entity 40 within the reception window.

RX_ERR_DROP counts the number of packets discarded in the O-RU entity 30 or the O-DU entity 40, among the packets of the C-Plane data or the U-Plane data that have arrived at the O-RU entity 30 or the O-DU entity 40. The packet counted in RX_ERR_DROP may be a packet that has arrived in the reception window or may be a packet that has arrived outside the reception window.

The following will explain an abnormality detection method when RX_CORRUPT, RX_DUPL, RX_SE- QID_ERR, RX_SEQID_ERR_C, or RX_ERR_DROP is used as the statistical data. In this case, the abnormality detection method may be, for example, to transmit an alarm when a ratio of the number of RX_CORRUPT, RX_DUPL, RX_SEQID_ERR, RX_SEQID_ERR_C, or RX_ERR_DROP to the number of RX_TOTAL exceeds a threshold value.

Alternatively, the abnormality detection method may be to transmit an alarm when a ratio of the number of RX_CORRUPT, RX_DUPL, RX_SEQID_ERR, RX_SE-QID_ERR_C, or RX_ERR_DROP to the number of RX_ON_TIME exceeds a threshold value.

Alternatively, the abnormality detection method may be to transmit an alarm when at least one of RX_CORRUPT, RX_DUPL, RX_SEQID_ERR, RX_SEQID_ERR_C, and RX_ERR_DROP exceeds a threshold value.

Alternatively, the abnormality detection method may be to transmit an alarm when RX_CORRUPT, RX_DUPL, RX_SEQID_ERR, RX_SEQID_ERR_C, or a packet relevant to RX_ERR_DROP is measured continuously by the number of times determined as a threshold value.

As explained above, in the third example embodiment, the O-RU entity 30 or the O-DU entity 40 can transmit an alarm in response to the number of packets including an error. As a result, management loads of the O-RU entity 30 and the O-DU entity 40 in an administrator of an NMS 50 or the like can be reduced as in the second example embodiment.

Fourth Example Embodiment

Next, a configuration example of a communication system according to a fourth example embodiment will be explained with reference to FIG. 7. FIG. 3 illustrates an example in which only one transmission path 61 exists as a transmission path for transmitting C-Plane data and U-Plane data, but FIG. 7 illustrates a configuration in which the C-Plane data and the U-Plane data are transmitted via a plurality of transmission paths.

Figure 7:
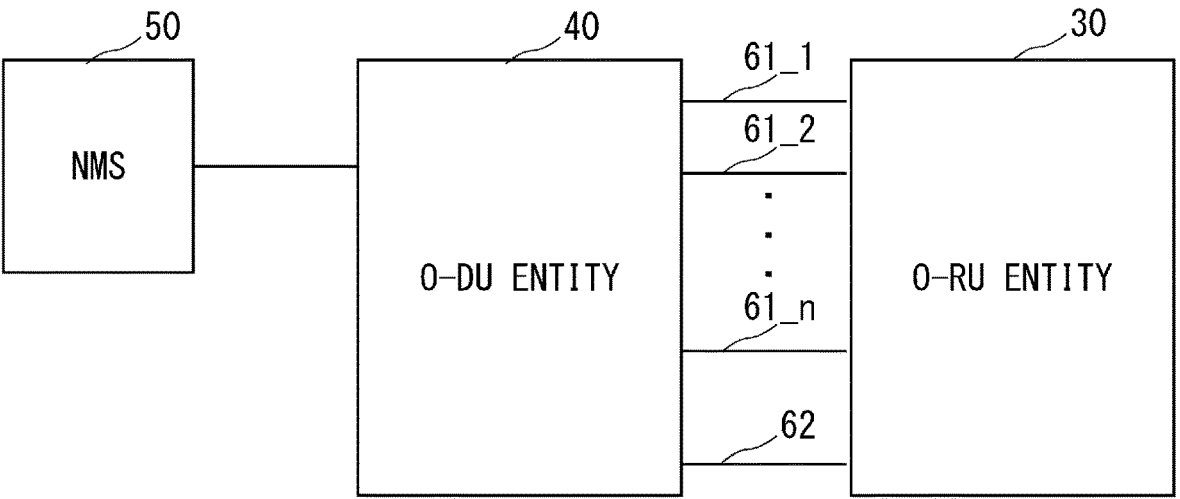
FIG. 7 is a configuration diagram of a communication system according to a fourth example embodiment.

As illustrated in FIG. 7, between an O-RU entity 30 and an O-DU entity 40, there exist transmission paths 61_1 to 61_n (n is an integer of two or more) as transmission paths for transmitting the C-Plane data and the U-Plane data. Furthermore, a transmission path 62 exists as a transmission path for transmitting M-Plane data. In other words, between the O-RU entity 30 and the O-DU entity 40, there exist a plurality of fronthauls for transmitting C-Plane data and U-Plane data, and a fronthaul for transmitting M-Plane data. Alternatively, the transmission path for transmitting the M-Plane data may be shared with any one of the transmission paths 61_1 to 61_n for transmitting the C-Plane data and the U-Plane data. In short, any one of the transmission paths 61_1 to 61_n for transmitting the C-Plane data and the U-Plane data may transmit the M-Plane data.

The O-RU entity 30 or the O-DU entity 40 may generate statistical data by using at least one of RX_ON_TIME, RX_ON_TIME_C, RX_EARLY, RX_EARLY_C, RX_LATE, RX_LATE_C, and RX_TOTAL for each transmission path, i.e., for each fronthaul. Further, the O-RU entity 30 or the O-DU entity 40 may generate the statistical data by using at least one of RX_CORRUPT, RX_DUPL, RX_SEQID_ERR, RX_SEQID_ERR_C, and RX_ERR_DROP for each transmission path.

Alternatively, the O-RU entity 30 or the O-DU entity 40 may collectively generate the statistical data by using RX_ON_TIME or the like for packets transmitted on the transmission paths 61_1 to 61_n.

The O-RU entity 30 or the O-DU entity 40 may implement the abnormality detection method explained in the second or third example embodiment for each transmission path, and determine whether the statistical information exceeds a threshold value. When the statistical information exceeds the threshold value, the O-RU entity 30 transmits an alarm to the O-DU entity 40 or transmits an alarm to an NMS 50 via the O-DU entity 40. The O-DU entity 40 sends an alarm to the NMS 50 when the statistical information exceeds the threshold value.

Alternatively, the O-RU entity 30 or the O-DU entity 40 may determine whether the statistical information generated by collectively generating the packets transmitted on the transmission paths 61_1 to 61_n exceeds a threshold value.

In FIG. 7, it has been explained that a plurality of physically different transmission paths are used in order to transmit C-Plane data and U-Plane data between the O-RU entity 30 and the O-DU entity 40. Herein, the plurality of transmission paths used for transmitting the C-Plane data and the U-Plane data may be a plurality of logical transmission paths set in one physical transmission path. For example, a plurality of logical transmission paths identified by using a port identifier may be set in one physical transmission path. For example, a logical transmission path may be identified by using a pair of port identifiers set in each of the O-RU entity 30 and the O-DU entity 40.

In addition, a plurality of logical transmission paths identified by using an extended Antenna carrier-identification/identifier (eaxc-id) may be set in one physical transmission path. The eaxc-id includes RU_Port_ID, DU_Port_ID, BandSector_ID, and a CC_ID. RU_Port_ID is a port identifier of the O-RU entity 30 and DU_Port_ID is a port identifier of the O-DU entity 40. BandSector_ID is an identifier of a band sector, and CC_ID is an identifier of a component carrier. Eaxc-id is determined in the O-RAN fronthaul specifications.

The O-RU entity 30 or the O-DU entity 40 may implement the abnormality detection method explained in the second or third example embodiment for each logical transmission path, and determine whether the statistical information exceeds a threshold value.

As explained above, the O-RU entity 30 and the O-DU entity 40 can implement the abnormality detection method explained in the second or third example embodiment for each of a plurality of physically different transmission paths or a plurality of logically different transmission paths. By causing the O-RU entity 30 or the O-DU entity 40 to autonomously transmit abnormal conditions related to a plurality of transmission paths to other apparatuses, it is possible to reduce administrative loads of an administrator that increases as the number of transmission paths increases.

Fifth Example Embodiment

Next, a configuration example of a communication system according to the fourth example embodiment will be explained with reference to FIG. 8. In the communication system in FIG. 8, a transmission path 62_2 for transmitting M-Plane data is added between an NMS 50 and an O-RU entity 30 in the communication system in FIG. 3. In short, the O-RU entity 30 transmits the M-Plane data to an O-DU entity 40 via a transmission path 621, and transmits the M-Plane data to the NMS 50 via the transmission path 62_2.

Figure 8:
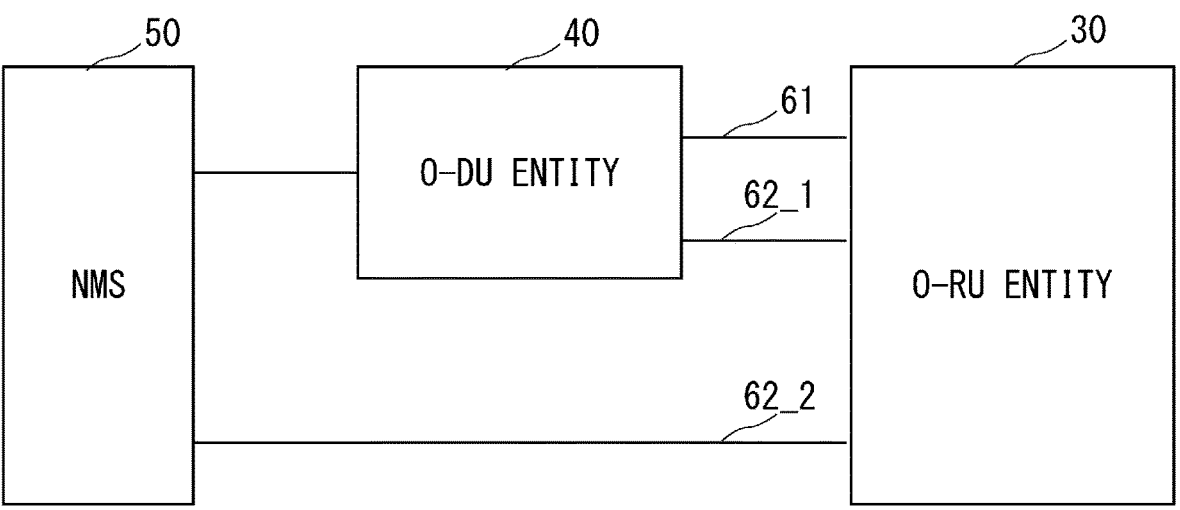
FIG. 8 is a configuration diagram of a communication system according to a fifth example embodiment.

In the communication system illustrated in FIG. 8, the O-RU entity 30 transmits an alarm to the NMS 50 not via the O-DU entity 40. Accordingly, even when an abnormality occurs in a transmission path between the O-RU entity 30 and the O-DU entity 40, the NMS 50 can receive an alarm from the O-RU entity 30. As a result, an administrator can detect the abnormality between the O-RU entity 30 and the O-DU entity 40 at an early stage.

Also in the communication system in FIG. 8, as explained in the fourth example embodiment, a plurality of transmission paths may be set between the O-RU entity 30 and the O-DU entity 40 in order to transmit C-Plane data and U-Plane data.

Sixth Example Embodiment

Next, a configuration example of a communication system according to a sixth example embodiment will be explained with reference to FIG. 9. The communication system in FIG. 9 has a configuration in which a Fronthaul Multiplexer (FHM) 80 is added to the communication system in FIG. 8. The FHM 80 copies C-Plane data and U-Plane data received from an O-DU entity 40 and transmits them to a plurality of O-RU entities 30. Further, the FHM 80 combines the C-Plane data and the U-Plane data received from each of the O-RU entities 30, and transmits the combined data to the O-DU entity 40.

The O-RU entity 30 transmits the C-Plane data and the U-Plane data to and from the FHM 80 via a transmission path 711. Similarly to FIG. 8, the O-RU entity 30 transmits the management data to the O-DU entity 40 and an NMS 50 via a transmission path 62_1 and a transmission path 62_2.

The O-DU entity 40 transmits the C-Plane data and the U-Plane data to and from the FHM 80 via a transmission path 71_2. The O-DU entity 40 transmits management data to and from the FHM 80 via the transmission path 72_1. In the transmission path 721, the management data may be transmitted as M-Plane data.

The NMS 50 transmits the management data to and from the FHM 80 via a transmission path 72_2. In addition, the NMS 50 may transmit management data to and from the O-DU entity 40 not via the FHM 80, as in FIG. 8.

Similarly to the O-RU entity 30 and the O-DU entity 40, the FHM 80 generates statistical information and performs abnormality detection. When an abnormality is detected, the FHM 80 transmits an alarm to the NMS 50 or the O-DU entity 40.

Figure 9:
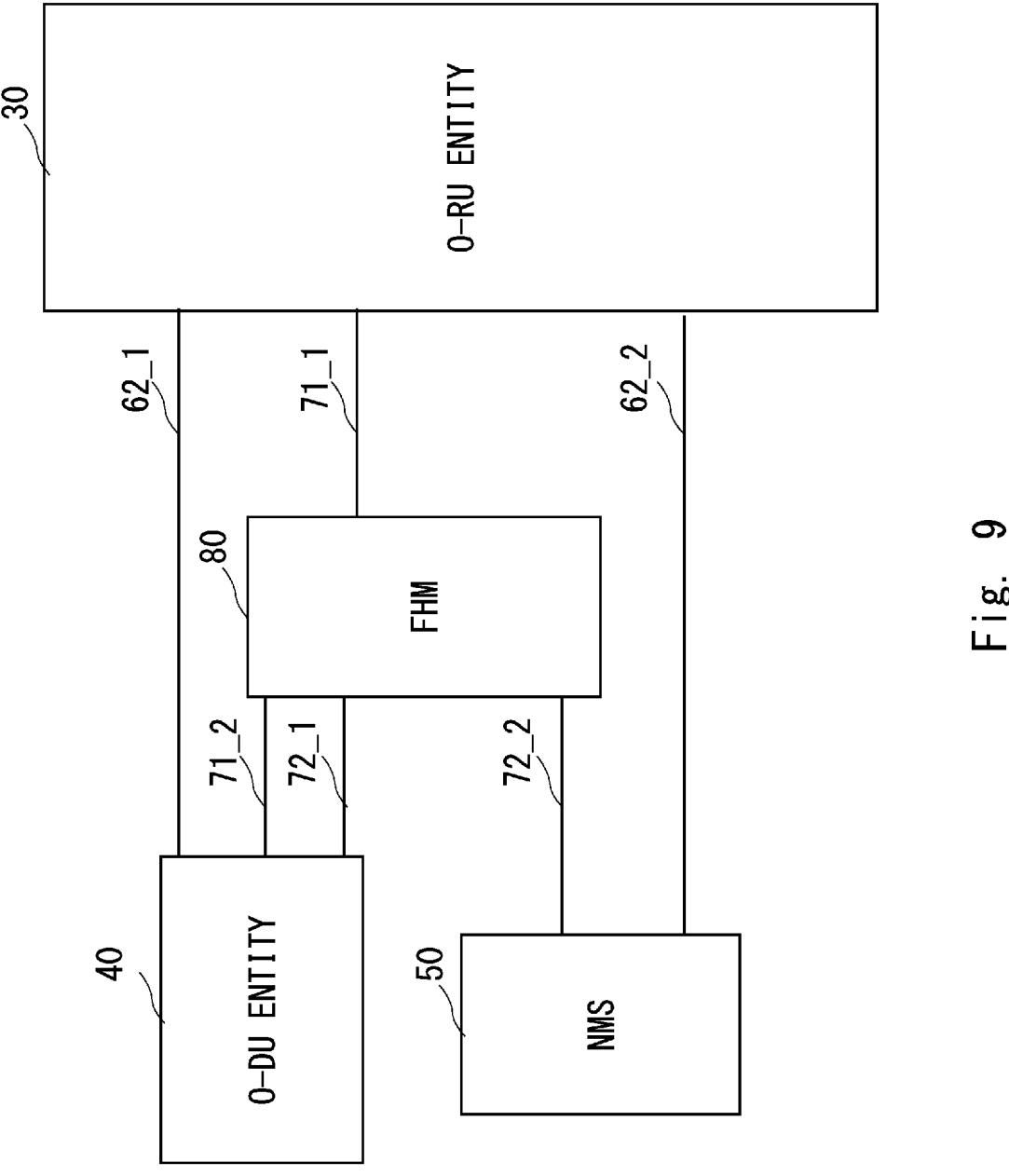
FIG. 9 is a configuration diagram of a communication system according to a sixth example embodiment.

In the communication system illustrated in FIG. 9, in a configuration including the FHM 80, the FHM 80 transmits an alarm to the O-DU entity 40 or the NMS 50. Accordingly, an administrator can detect an abnormality occurring in the FHM 80, in addition to the abnormalities occurring in the O-RU entity 30 and the O-DU entity 40.

Figure 10:
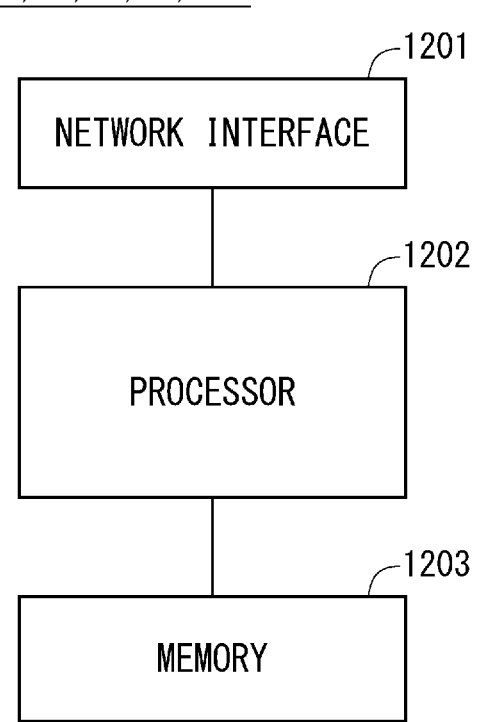
FIG. 10 is a diagram of an RU apparatus and the like according to each example embodiment.

FIG. 10 is a block diagram illustrating a configuration example of the RU apparatus 10, the DU apparatus 20, the O-RU entity 30, the O-DU entity 40, the NMS 50, and the FHM 80 (hereinafter, referred to as the RU apparatus 10 or the like). Referring to FIG. 10, the RU apparatus 10 and the like include a network interface 1201, a processor 1202, and a memory 1203. The network interface 1201 may be used for communicating with other network nodes. The network interface 1201 may include, for example, a network interface card (NIC) compliant with IEEE 802.3 series.

The processor 1202 reads and executes software (a computer program) from the memory 1203 and performs processing of the RU apparatus 10 and the like explained with reference to a flowchart in the above-described example embodiment. The processor 1202 may be, for example, a microprocessor, an MPU, or a CPU. The processor 1202 may include a plurality of processors.

The memory 1203 is constituted of a combination of a volatile memory and a non-volatile memory. The memory 1203 may include a storage located remotely from the processor 1202. In this case, the processor 1202 may access the memory 1203 via Input/Output (I/O) interfaces, which are not illustrated.

In the example of FIG. 10, the memory 1203 is used for storing software modules. The processor 1202 reads these software modules from the memory 1203 and executes the software modules, thereby enabling to perform the processing of the RU apparatus 10 and the like explained in the above-described example embodiments.

As explained with reference to FIG. 10, each of the processors included in the RU apparatus 10 and the like in the above-described example embodiments executes one or a plurality of programs including instructions for causing a computer to perform the algorithm explained with reference to the drawings.

In the examples described above, the program may be stored and supplied to a computer by using various types of non-transitory computer-readable media. The non-transitory computer-readable media include various types of tangible storage media. Examples of the non-transitory computer-readable media include magnetic recording media (e.g., flexible disks, magnetic tapes, and hard disk drives), magneto-optical recording media (e.g., magneto-optical disks), Read Only Memory (CD-ROM), CD-R, CD-R/W, and semi-conductor memory (e.g., mask ROM, Programmable ROM (PROM), Erasable PROM (EPROM), flash ROM, Random Access Memory (RAM)). The program may also be supplied to the computer by various types of transitory computer-readable media. Examples of the transitory computer-readable media include electrical signals, optical signals, and electromagnetic waves. The transitory computer-readable medium can supply the program to a computer via a wired communication path such as an electric wire and an optical fiber, or a wireless communication path.

The present disclosure is not limited to the above-described example embodiments, and can be appropriately modified without departing from the scope of the present disclosure.

Some or all of the above-described example embodiments may be described as the following supplementary notes, but are not limited thereto.

(Supplementary Note 1)

An RU apparatus including:

a reception unit configured to receive a packet from a distributed unit (DU) apparatus configured to execute processing of a higher-level layer than a layer to be executed by a remote unit (RU) apparatus among communication functions of a base station that are divided into a plurality of layers; and a transmission unit configured to transmit an alarm signal to the DU apparatus or a management apparatus configured to manage a network when statistical information regarding the received packet satisfies a predetermined criterion.

(Supplementary Note 2)

The RU apparatus according to supplementary note 1, wherein statistical information regarding the packet is information indicating that an abnormality occurs in communication with the DU apparatus.

(Supplementary Note 3)

The RU apparatus according to supplementary note 2, wherein statistical information regarding the packet is information regarding a packet received in a period different from a reception window being a period in which the packet transmitted from the DU apparatus can be normally received.

(Supplementary Note 4)

The RU apparatus according to supplementary note 3, wherein the transmission unit is configured to transmit the alarm signal when the number of packets received in a period different from the reception window exceeds a predetermined threshold value.

(Supplementary Note 5)

The RU apparatus according to supplementary note 3, wherein the transmission unit is configured to transmit the alarm signal when a ratio of the number of packets received in a period different from the reception window to all packets received in a period including the reception window exceeds a predetermined threshold value.

(Supplementary Note 6)

The RU apparatus according to supplementary note 2, wherein statistical information regarding the packet is information regarding a packet including an error.

(Supplementary Note 7)

The RU apparatus according to supplementary note 6, wherein the transmission unit is configured to transmit the alarm signal when the number of packets including the error or a ratio related to the number of packets including the error exceeds a predetermined threshold value.

(Supplementary Note 8)

The RU apparatus according to any one of supplementary notes 1 to 7, wherein the reception unit is configured to receive the predetermined criterion from the DU apparatus or the management apparatus.

(Supplementary Note 9)

A DU apparatus including:

a reception unit configured to receive a packet from an RU apparatus configured to execute processing of a lower-level layer than a layer to be executed by a DU apparatus among communication functions of a base station that are divided into a plurality of layers; and a transmission unit configured to transmit an alarm signal to a management apparatus configured to manage a network when statistical information regarding the received packet satisfies a predetermined criterion.

(Supplementary Note 10)

The DU apparatus according to supplementary note 9, wherein statistical information regarding the packet is information indicating that an abnormality occurs in communication with the RU apparatus.

(Supplementary Note 11)

The DU apparatus according to supplementary note 10, wherein statistical information regarding the packet is information regarding a packet received in a period different from a reception window being a period in which the packet transmitted from the RU apparatus can be normally received.

(Supplementary Note 12)

The DU apparatus according to supplementary note 11, wherein the transmission unit is configured to transmit the alarm signal when the number of packets received in a period different from the reception window exceeds a predetermined threshold value.

(Supplementary Note 13)

The DU apparatus according to supplementary note 11, wherein the transmission unit is configured to transmit the alarm signal when a ratio of the number of packets received in a period different from the reception window to all packets received in a period including the reception window exceeds a predetermined threshold value.

17

18

(Supplementary Note 14)

The DU apparatus according to supplementary note 10, wherein statistical information regarding the packet is information regarding a packet including an error.

(Supplementary Note 15)

The DU apparatus according to supplementary note 14, wherein the transmission unit is configured to transmit the alarm signal when the number of packets including the error or a ratio related to the number of packets including the error exceeds a predetermined threshold value.

(Supplementary Note 16)

The DU apparatus according to any one of supplementary notes 9 to 15, wherein the reception unit is configured to receive the predetermined criterion from the management apparatus.

(Supplementary Note 17)

The DU apparatus according to any one of supplementary notes 9 to 16, wherein the transmission unit transmits the predetermined criterion to the RU apparatus.

(Supplementary Note 18)

A communication system including:

an RU apparatus configured to execute a part of layer processing among communication functions of a base station that are divided into a plurality of layers;

a DU apparatus configured to transmit and receive a packet to and from the RU apparatus, and execute processing of a higher-level layer than a layer to be executed by the RU apparatus; and a management apparatus configured to manage a network including the RU apparatus and the DU apparatus, wherein at least one of the RU apparatus and the DU apparatus is configured to transmit an alarm signal to the management apparatus when statistical information regarding the received packet satisfies a predetermined criterion, and the management apparatus transmits the predetermined criterion to at least one of the RU apparatus configured to transmit the alarm signal and the DU apparatus configured to transmit the alarm signal.

(Supplementary Note 19)

The communication system according to supplementary note 18, wherein statistical information regarding the packet is information indicating that an abnormality occurs in communication with the DU apparatus.

(Supplementary Note 20)

A communication method being executed in an RU apparatus, the communication method including:

receiving a packet from a distributed unit (DU) apparatus configured to execute processing of a higher-level layer than a layer to be executed by a remote unit (RU) apparatus among communication functions of a base station that are divided into a plurality of layers; and transmitting, when statistical information regarding the received packet satisfies a predetermined criterion, an alarm signal to the DU apparatus or a management apparatus configured to manage a network.

(Supplementary Note 21)

A communication method being executed in a DU apparatus, the communication method including:

receiving a packet from an RU apparatus configured to execute processing of a lower-level layer than a layer to be executed by a DU apparatus among communication functions of a base station that are divided into a plurality of layers; and transmitting, when statistical information regarding the received packet satisfies a predetermined criterion, an alarm signal to a management apparatus configured to manage a network.

(Supplementary Note 22)

A program causing a computer to execute:

receiving a packet from a distributed unit (DU) apparatus configured to execute processing of a higher-level layer than a layer to be executed by a remote unit (RU) apparatus among communication functions of a base station that are divided into a plurality of layers; and transmitting an alarm signal to the DU apparatus or a management apparatus configured to manage a network when statistical information regarding the received packet satisfies a predetermined criterion.

(Supplementary Note 23)

A program causing a computer to execute:

receiving a packet from an RU apparatus configured to execute processing of a lower-level layer than a layer to be executed by a DU apparatus among communication functions of a base station that are divided into a plurality of layers; and transmitting an alarm signal to a management apparatus configured to manage a network when statistical information regarding the received packet satisfies a predetermined criterion.

The present disclosure is not limited to the above-described example embodiments, and can be appropriately modified without departing from the scope of the present disclosure.

REFERENCE SIGNS LIST

10 RU APPARATUS
11 RECEPTION UNIT
12 TRANSMISSION UNIT
20 DU APPARATUS
21 RECEPTION UNIT
22 TRANSMISSION UNIT
30 O-RU ENTITY
40 O-DU ENTITY
50 NMS
61 TRANSMISSION PATH
61_1 TRANSMISSION PATH
61_2 TRANSMISSION PATH
61_$n$ TRANSMISSION PATH
62 TRANSMISSION PATH
62_1 TRANSMISSION PATH
62_2 TRANSMISSION PATH
71_1 TRANSMISSION PATH
71_2 TRANSMISSION PATH
72_1 TRANSMISSION PATH
72_2 TRANSMISSION PATH
80 FHM

What is claimed is:

1. A remote unit (RU) apparatus comprising:

at least one memory storing instructions, and at least one processor configured to execute the instructions to;

receive a packet from a distributed unit (DU) apparatus configured to execute processing of a higher-level layer than a layer to be executed by a RU apparatus among communication functions of a base station that are divided into a plurality of layers;

transmit an alarm signal to the DU apparatus or a management apparatus configured to manage a network when statistical information regarding the received packet satisfies a predetermined criterion; and transmit the alarm signal when the number of packets received in a period different from a reception window exceeds a predetermined threshold value, wherein the reception window is a period in which the packet transmitted from the DU apparatus can be normally received.

2. The RU apparatus according to claim 1, wherein statistical information regarding the packet is information indicating that an abnormality occurs in communication with the DU apparatus.

3. The RU apparatus according to claim 2, wherein statistical information regarding the packet is information regarding a packet received in a period different from the reception window.

4. The RU apparatus according to claim 2, wherein statistical information regarding the packet is information regarding a packet including an error.

5. The RU apparatus according to claim 4, wherein the at least one processor is further configured to execute the instructions to transmit the alarm signal when the number of packets including the error or a ratio related to the number of packets including the error exceeds a predetermined threshold value.

6. The RU apparatus according to claim 1, wherein the at least one processor is further configured to execute the instructions to receive the predetermined criterion from the DU apparatus or the management apparatus.

7. A distributed unit (DU) DU apparatus comprising:

at least one memory storing instructions, and at least one processor configured to execute the instructions to;

receive a packet from a remote unite (RU) an RU apparatus configured to execute processing of a lower-level layer than a layer to be executed by a DU apparatus among communication functions of a base station that are divided into a plurality of layers; and transmit an alarm signal to a management apparatus configured to manage a network when statistical information regarding the received packet satisfies a predetermined criterion; and transmit the alarm signal when the number of packets received in a period different from a reception window exceeds a predetermined threshold value, wherein the reception window is a period in which the packet transmitted from the DU apparatus can be normally received.

8. The DU apparatus according to claim 7, wherein statistical information regarding the packet is information indicating that an abnormality occurs in communication with the RU apparatus.

9. The DU apparatus according to claim 8, wherein statistical information regarding the packet is information regarding a packet received in a period different from the reception window.

10. The DU apparatus according to claim 8, wherein statistical information regarding the packet is information regarding a packet including an error.

11. The DU apparatus according to claim 10, wherein the at least one processor is further configured to execute the instructions to transmit the alarm signal when the number of packets including the error or a ratio related to the number of packets including the error exceeds a predetermined threshold value.

12. The DU apparatus according to claim 7, wherein the at least one processor is further configured to execute the instructions to receive the predetermined criterion from the management apparatus.

13. The DU apparatus according to claim 7, wherein the at least one processor is further configured to execute the instructions to transmit the predetermined criterion to the RU apparatus.

14. A communication method being executed in a remote unit (RU) apparatus, the communication method comprising:

receiving a packet from a distributed unit (DU) apparatus configured to execute processing of a higher-level layer than a layer to be executed by a RU apparatus among communication functions of a base station that are divided into a plurality of layers; and transmitting, when statistical information regarding the received packet satisfies a predetermined criterion, an alarm signal to the DU apparatus or a management apparatus configured to manage a network; and transmitting the alarm signal when the number of packets received in a period different from a reception window exceeds a predetermined threshold value, wherein the reception window is a period in which the packet transmitted from the DU apparatus can be normally received.

* * * * *